United States Patent
Sakaguchi et al.

(10) Patent No.: US 10,938,066 B2
(45) Date of Patent: Mar. 2, 2021

(54) NONAQUEOUS ELECTROLYTE SOLUTION FOR SECONDARY BATTERIES AND SECONDARY BATTERY PROVIDED WITH SAME

(71) Applicant: STELLA CHEMIFA CORPORATION, Osaka (JP)

(72) Inventors: Toshitaka Sakaguchi, Osaka (JP); Yoshifumi Katsura, Osaka (JP); Tetsuo Nishida, Osaka (JP)

(73) Assignee: STELLA CHEMIFA CORPORATION, Osaka (JP)

( * ) Notice: Subject to any disclaimer, the term of this patent is extended or adjusted under 35 U.S.C. 154(b) by 667 days.

(21) Appl. No.: 15/118,827

(22) PCT Filed: Feb. 16, 2015

(86) PCT No.: PCT/JP2015/054057
§ 371 (c)(1),
(2) Date: Aug. 12, 2016

(87) PCT Pub. No.: WO2015/122512
PCT Pub. Date: Aug. 20, 2015

(65) Prior Publication Data
US 2017/0054178 A1  Feb. 23, 2017

(30) Foreign Application Priority Data
Feb. 14, 2014  (JP) .................................. 2014-026983

(51) Int. Cl.
*H01M 10/0567* (2010.01)
*H01M 10/052* (2010.01)
(Continued)

(52) U.S. Cl.
CPC ..... *H01M 10/0567* (2013.01); *H01M 10/052* (2013.01); *H01M 10/054* (2013.01); *H01M 10/0525* (2013.01); *H01M 2300/0025* (2013.01)

(58) Field of Classification Search
CPC ................................................ H01M 10/0567
See application file for complete search history.

(56) References Cited

U.S. PATENT DOCUMENTS

| 2011/0177395 A1* | 7/2011 | Kamisasa | H01M 4/661 429/246 |
| 2013/0037742 A1* | 2/2013 | Oda | C01G 53/42 252/182.1 |

FOREIGN PATENT DOCUMENTS

| CN | 102738503 A | * 10/2012 |
| JP | H8-138733 A | 5/1996 |

(Continued)

OTHER PUBLICATIONS

TranslationJPH08138733 (Year: 2019).*

(Continued)

*Primary Examiner* — Brian R Ohara
(74) *Attorney, Agent, or Firm* — Knobbe Martens Olson & Bear, LLP

(57) ABSTRACT

A phosphodiester salt is added to the electrolytic solution to form a nonaqueous electrolytic solution for a secondary battery. The nonaqueous electrolytic solution has excellent storage characteristics in a temperature load environment. Deterioration of the charge-discharge characteristics of the nonaqueous electrolytic solution and increase in internal resistance of the nonaqueous electrolytic solution are suppressed during storage. A secondary battery having a positive electrode and a negative electrode makes use of this electrolytic solution.

2 Claims, 2 Drawing Sheets

(51) Int. Cl.
    *H01M 10/0525*   (2010.01)
    *H01M 10/054*    (2010.01)

(56) References Cited

FOREIGN PATENT DOCUMENTS

| JP | 11-67270 A | 3/1999 |
| JP | 2000-123867 A | 4/2000 |
| JP | 2004-31079 A | 1/2004 |
| JP | 2012-001459 A | 1/2012 |
| JP | 2014-12649 A | 1/2014 |
| JP | 2014-022332 A | 2/2014 |
| WO | 2006/008921 A1 | 1/2006 |
| WO | 2013/002186 A1 | 1/2013 |

OTHER PUBLICATIONS

Definition (Year: 2019).*
TranslationJP2014012649 (Year: 2020).*
TranslationCN102738503 (Year: 2020).*
International Search Report dated Mar. 10, 2015 for International Application No. PCT/JP2015/054057.
Office Action in Chinese Patent Application No. 201580003797.3 dated Jun. 5, 2018.
Notice of Reasons for Rejection in Japanese Patent Application No. 2015-027071 dated Dec. 26, 2018.
Rubinstein, M., and A. Patchornik, A Novel Method for Phosphodiester and Internucleotide Bond Synthesis, Tetrahedron 31:2107-2110, 1975.
Third Office Action and Examination Opinion issued in connection with Chinese Patent Application No. 201580003797.3 dated Aug. 8, 2019.
Notice of Second Office Action in Chinese Patent Application No. 201580003797.3, dated Jan. 22, 2019.
Decision of Rejection issued in corresponding CN application No. 201580003797.3, dated Feb. 3, 2020.

* cited by examiner

NONAQUEOUS ELECTROLYTE SOLUTION FOR SECONDARY BATTERIES AND SECONDARY BATTERY PROVIDED WITH SAME

INCORPORATION BY REFERENCE TO ANY PRIORITY APPLICATIONS

This application is the U.S. National Phase of International Application No. PCT/JP2015/054057, filed Feb. 16, 2015, designating the U.S. and claiming priority to Japanese Application No. 2014-026983, filed Feb. 14, 2014. Any and all applications for which a foreign or domestic priority claim is identified here or in the Application Data Sheet as filed with the present application are hereby incorporated by reference under 37 CFR 1.57.

FIELD OF THE INVENTION

The present invention relates to a nonaqueous electrolytic solution for secondary batteries that is slight in charge-discharge characteristic degradation and in internal resistance rise after stored in a temperature load environment, and a secondary battery having this nonaqueous electrolytic solution.

BACKGROUND OF THE INVENTION

In recent years, a field to which secondary batteries, typical examples being lithium secondary batteries, are applied has been enlarging from electronic devices, such as portable telephones, personal computers and digital cameras, to in-vehicle articles. Following the enlargement, further improvements in performance of secondary batteries have been advanced. For example, secondary batteries are improved in output density and energy density, and are restrained in capacity loss. For in-vehicle usage, secondary batteries have been desired to have an endurance higher than conventional endurances against use environment temperatures which are both of high temperatures and low temperatures. About, in particular, a high temperature environment, cells of the batteries are made large in size to be always exposed to a relatively high temperature not only by the use environment temperature but also by self-heating. It is therefore very important to improve secondary batteries in high temperature endurance. Furthermore, when a secondary battery is stored in a high temperature environment, its electrodes, electrolytic solution or electrolyte is deteriorated. Following the deterioration, a cell thereof rises in internal resistance to produce a remarkable energy loss resulting from the internal resistance in a low temperature environment.

In conventional ordinary lithium secondary batteries, as each of their positive active material and negative active material, a material into which a Li ion can be reversibly inserted has been used. The positive active material may be, for example, a compound such as $LiNiO_2$, $LiCoO_2$, $LiMn_2O_4$, or $LiFePO_4$. The negative active material may be, for example, a lithium metal, an alloy thereof, a carbon material, or a graphite material. Furthermore, an electrolytic solution used in the lithium secondary batteries is a solution in which an electrolyte such as $LiPF_6$ or $LiBF_4$ is dissolved in a mixed solvent made of two or more selected from ethylene carbonate, diethyl carbonate, propylene carbonate and others.

At an interface between such an electrode active material and such an electrolytic solution, it is generally interpreted that a stable coating film (solid electrolyte interface) is formed, which has lithium ion conductivity but has no electron conductivity. A process in which lithium ions are inserted into/eliminated from an electrode active material is excellent in reversibility. However, when a lithium secondary battery is stored in a high temperature environment, its stable interface is cracked or dissolved/decomposed so that the battery tends to be lowered in charge-discharge characteristics, or increased in impedance.

For example, Patent Document 1 listed below discloses that a cyclic ester having in the cycle thereof a $C=C$ unsaturated bond, or a derivative thereof is incorporated into an electrolytic solution of a lithium ion secondary battery as described above. This document states that the battery can be improved in cycle characteristics. It is generally interpreted that the improvement is made by an effect obtained by a coating film formed by the cyclic ester, which has in the cycle thereof a $C=C$ unsaturated bond, or the derivative thereof.

Patent Documents 2 and 3 listed below disclose the use of a nonaqueous electrolytic solution containing, as an additive, a monofluorophosphate or a difluorophosphate. These patent documents state that a coating film can be formed on each of a positive electrode and a negative electrode of the lithium secondary battery to restrain the decomposition of the electrolytic solution, the decomposition being caused by contact of the nonaqueous electrolytic solution with the positive active material and the negative active material, so that the battery can be restrained in self-discharge, and improved in storage performance and output characteristics.

According to any one of Patent Documents 1 to 3 listed below, the secondary battery is insufficient in storage characteristics in a high temperature environment. Thus, it is necessary that a battery is further improved against problems that after stored, the battery is lowered in charge-discharge characteristics and is raised in internal resistance.

PRIOR ART DOCUMENTS

Patent Documents

Patent Document 1: JP-A-2000-123867
Patent Document 2: JP-A-11-67270
Patent Document 3: JP-A-2004-31079

SUMMARY OF THE INVENTION

Problems to be Solved by the Invention

In light of the above-mentioned problems, the present invention has been made. An object thereof is to provide a nonaqueous electrolytic solution for secondary batteries that is excellent in storage characteristics in a temperature load environment, and is restrained in charge-discharge characteristic degradation and in internal resistance rise after stored; and a secondary battery having this nonaqueous electrolytic solution.

Solutions to the Problems

In order to solve the above-mentioned problems, the nonaqueous electrolytic solution for secondary batteries according to the present invention, which is used in a secondary battery, a phosphodiester salt being added to the electrolytic solution.

In the above-mentioned configuration, it is preferable that the additive amount of the phosphodiester salt ranges from 0.005 to 5% by mass of the total of the nonaqueous electrolytic solution.

In order to solve the above-mentioned problems, the secondary battery according to the present invention comprises at least: the nonaqueous electrolytic solution for secondary batteries; a positive electrode; and a negative electrode.

Effects of the Invention

According to the present invention, the addition of a phosphodiester salt to a nonaqueous electrolytic solution for secondary batteries makes it possible to restrain any secondary battery, which has this electrolytic solution, from being lowered in charge-discharge characteristics and further being raised in internal resistance even after the battery is exposed to a high temperature environment. Although a mechanism thereof is unclear, it is presumed that the addition of the phosphodiester salt results in the formation of a coating film on the surface of one or more electrode active materials in the battery and the above-mentioned advantages are produced by heat stability, film quality and other effects that this coating film has.

DETAILED DESCRIPTION OF THE INVENTION

Nonaqueous Electrolytic Solution for Secondary Batteries

Figure 1:
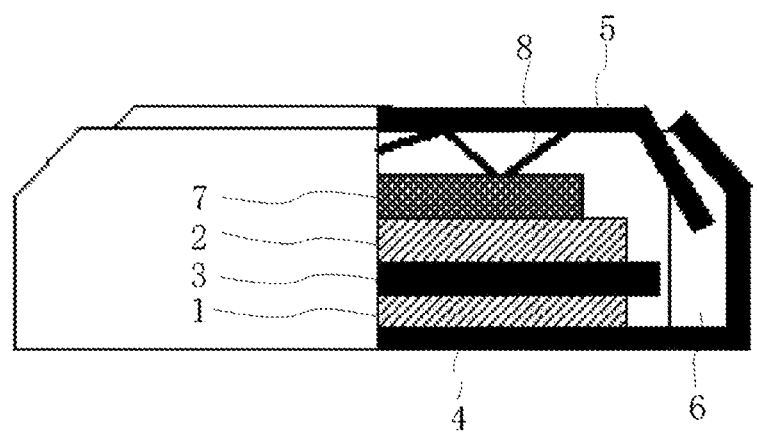
FIG. 1 is a schematic sectional view which schematically illustrates a secondary battery having a nonaqueous electrolytic solution, for secondary batteries, according to an embodiment of the present invention.

A nonaqueous electrolytic solution for secondary batteries (hereinafter referred to as a "nonaqueous electrolytic solution") according to the present embodiment is an electrolytic solution in which at least one phosphodiester salt is added, as an additive, to an organic solvent (nonaqueous solvent) in which an electrolyte is dissolved.

At an initial time of charging a secondary battery having such a nonaqueous electrolytic solution, an irreversible reaction that this electrolytic solution is decomposed is generated at an interface between its electrodes and the nonaqueous electrolytic solution. In accordance with the kind of its electrode active materials, the kind of a nonaqueous solvent, an electrolyte and an additive in the nonaqueous electrolytic solution, and charge-discharge conditions, natures of a film to be formed on the interface would be largely varied, examples of the natures including the thermal stability, ion conductivity, morphology, and denseness of the film. In the present embodiment also, a coating film is formed on each of its electrode active materials by adding the phosphodiester salt to a nonaqueous electrolytic solution. Natures of this coating film, that is, the effect of the thermal stability, the quality and other natures of the film would restrain the secondary battery from being lowered in charge-discharge characteristics and being raised in internal resistance even after the secondary battery is exposed to a high temperature environment.

<Phosphodiester Salt>

A specific example of the phosphodiester salt referred to herein is represented by the following chemical formula (1):

[Chem. 1]

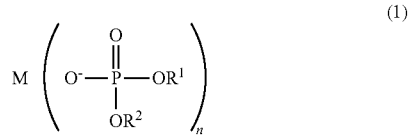

wherein M represents a monovalent, bivalent or trivalent cation; and when M is monovalent, n=1; when M is bivalent, n=2; or when M is trivalent, n=3.

In the chemical formula (1), M represents an alkali metal ion, an alkaline earth metal ion, an aluminum ion, a transition metal ion or an onium ion.

The alkali metal of the alkali metal ion is not particularly limited. Examples thereof include lithium, sodium, potassium, rubidium, and cesium. These may be used alone or in any combination of two or more thereof.

The alkaline earth metal of the alkaline earth metal ion is not particularly limited. Examples thereof include magnesium, calcium, strontium, barium, and radium. These may be used alone or in any combination of two or more thereof.

The transition metal of the transition metal ion is not particularly limited. Examples thereof include manganese, cobalt, nickel, iron, chromium, copper, molybdenum, tungsten, and vanadium. These may be used alone or in any combination of two or more thereof.

Examples of the onium ion include an ammonium ion ($NH^{4+}$), a primary ammonium ion, a secondary ammonium ion, a tertiary ammonium ion, a quaternary ammonium ion, a quaternary phosphonium ion, and a sulfonium ion.

The primary ammonium which forms the primary ammonium ion is not particularly limited. Examples thereof include methylammonium, ethylammonium, propylammonium, and isopropylammonium. These may be used alone or in any combination of two or more thereof.

The secondary ammonium which forms the secondary ammonium ion is not particularly limited. Examples thereof include dimethylammonium, diethylammonium, dipropylammonium, dibutylammonium, methylethylammonium, methylpropylammonium, methylbutylammonium, propylbutylammonium, and diisopropylammonium. These may be used alone or in any combination of two or more thereof.

The tertiary ammonium which forms the tertiary ammonium ion is not particularly limited. Examples thereof include trimethylammonium, triethylammonium, tripropylammonium, tributylammonium, ethyldimethylammonium, diethylmethylammonium, triisopropylammonium, dimethylisopropylammonium, diethylisopropylammonium, dimethylpropylammonium, and butyldimethylammonium. These may be used alone or in any combination of two or more thereof.

The quaternary ammonium which forms the quaternary ammonium ion is not particularly limited. Examples thereof include an aliphatic quaternary ammonium, an imidazolium, a pyridinium, a pyrazolium, and a pyridazinium. These may be used alone or in any combination of two or more thereof.

The aliphatic quaternary ammonium is not particularly limited. Examples thereof include tetraethylammonium, tetrapropylammonium, tetraisopropylammonium, trimethylethylammonium, dimethyldiethylammonium, methyltriethylammonium, trimethylpropylammonium, trimethylisopropylammonium, tetrabutylammonium, trimethylbutylammonium, trimethylpentylammonium, trimethylhexylammonium, 1-ethyl-1-methyl-pyrrolidinium, 1-butyl-1-methylpyrrolidinium, 1-ethyl-1-methyl-piperidinium, and 1-butyl-1-methylpiperidinium. These may be used alone or in any combination of two or more thereof.

The imidazolium is not particularly limited. Examples thereof include 1.3dimethyl-imidazolium, 1-ethyl-3-methylimidazolium, 1-n-propyl-3-methylimidazolium, 1-n-butyl-3-methylimidazolium, and 1-n-hexyl-3-methylimidazolium. These may be used alone or in any combination of two or more thereof.

The pyridinium is not particularly limited. Examples thereof include 1-methylpyridinium, 1-ethylpyridinium, and 1-n-propylpyridinium. These may be used alone or in any combination of two or more thereof.

The pyrazolium is not particularly limited. Examples thereof include 1,2-dimethylpyrazolium, 1-methyl-2-ethylpyrazolium, 1-propyl-2-methylpyrazolium, 1-methyl-2-butylpyrazolium, 1-methylpyrazolium, 3-methylpyrazolium, 4-methylpyrazolium, 4-iodopyrazolium, 4-bromopyrazolium, 4-iodo-3-methylpyrazolium, 4-bromo-3-methylpyrazolium, and 3-trifluoromethylpyrazolium. These may be used alone or in any combination of two or more thereof.

The pyridazinium is not particularly limited. Examples thereof include 1-methylpyridazinium, 1-ethylpyridazinium, 1-propylpyridazinium, 1-butylpyridazinium, 3-methylpyridazinium, 4-methylpyridazinium, 3-methoxypyridazinium, 3,6-dichloropyridazinium, 3,6-dichloro-4-methylpyridazinium, 3-chloro-6-methylpyridazinium, and 3-chloro-6-methoxypyridazinium. These may be used alone or in any combination of two or more thereof.

The quaternary phosphonium which forms the quaternary phosphonium ion is not particularly limited. Examples thereof include benzyltriphenylphosphonium, tetraethylphosphonium, and tetraphenylphosphonium. These may be used alone or in any combination of two or more thereof.

The sulfonium ion is not particularly limited. Examples thereof include trimethylsulfonium, triphenylsulfonium, and triethylsulfonium. These may be used alone or in any combination of two or more thereof.

In the chemical formula (1), $R^1$(s) and $R^2$(s) described above are appropriately selectable from various structures when the phosphodiester salt is synthesized, and each independently represent a hydrocarbon group, or a hydrocarbon group having at least one selected from halogen atoms, heteroatoms, and unsaturated bonds (hereinafter, the group will be referred to as a hydrocarbon group having a halogen atom or the like). The number of carbon atoms of the hydrocarbon group is from 1 to 20, preferably from 1 to 10, more preferably from 1 to 4. The number of carbon atoms of the hydrocarbon group having a halogen atom or the like is from 1 to 20, preferably from 1 to 10, more preferably from 1 to 4. The number of unsaturated bonds is preferably from 1 to 10, more preferably from 1 to 5, in particular preferably from 1 to 3.

Specific examples of the hydrocarbon group or the hydrocarbon group having a halogen atom or the like include linear alkyl groups such as methyl, ethyl, propyl, butyl, isopropyl, pentyl, hexyl, heptyl and octyl groups; cyclic alkyl groups such as cyclopentyl and cyclohexyl groups; halogen-containing linear alkyl groups such as 2-iodoethyl, 2-bromoethyl, 2-chloroethyl, 2-fluoroethyl, 1,2-diiodoethyl, 1,2-dibromoethyl, 1,2-dichloroethyl, 1,2-difluoroethyl, 2,2-diiodoethyl, 2,2-dibromoethyl, 2,2-dichloroethyl, 2,2-difluoroethyl, 2,2,2-tribromoethyl, 2,2,2-trichloroethyl, 2,2,2-trifluoroethyl, and hexyfluoro-2-propyl groups; halogen-containing cyclic alkyl groups such as 2-iodocyclohexyl, 2-bromocyclohexyl, 2-chlorocyclohexyl, and 2-fluorocyclohexyl groups; linear alkenyl groups such as 2-propenyl, isopropenyl, 2-butenyl, and 3-butenyl groups; cyclic alkenyl groups such as 2-cyclopentenyl, 2-cyclohexenyl, and 3-cyclohexenyl groups; linear alkynyl groups such as 2-propynyl, 1-butynyl, 2-butynyl, 3-butynyl, 1-pentynyl, 2-pentynyl, 3-pentynyl, and 4-pentynyl groups; phenyl groups such as phenyl, 3-methoxylphenyl, 4-methoxyphenyl, 3,5-dimethoxyphenyl, and 4-phenoxyphenyl groups; halogen-containing phenyl groups such as 2-iodophenyl, 2-bromophenyl, 2-chlorophenyl, 2-fluorophenyl, 3-iodophenyl, 3-bromophenyl, 3-chlorophenyl, 3-fluorophenyl, 4-iodophenyl, 4-bromophenyl, 4-chlorophenyl, 4-fluorophenyl, 3,5-diiodophenyl, 3,5-dibromophenyl, 3,5-dichlorophenyl, and 3,5-difluorophenyl groups; and naphthyl groups such as 1-naphthyl, 2-naphthyl, and 3-amino-2-naphthyl groups.

The above-mentioned halogen atoms each mean fluorine, chlorine, bromine, or iodine. The hydrogen atoms in the above-mentioned hydrocarbon group may be partially or wholly substituted with one or more of these halogen atoms. The heteroatoms each mean, for example, an oxygen, nitrogen or sulfur atom.

In the functional groups specifically mentioned above, $R^1$(s) described above may be identical with or different from $R^2$(s) described above in kind. The functional groups are mere examples; thus, $R^1$(s) and $R^2$(s) are not limited to these specific examples.

The additive amount of the phosphodiester salt preferably ranges from 0.005 to 5% by mass of the total of the nonaqueous electrolytic solution, more preferably from 0.01 to 3% by mass thereof, even more preferably from 0.1 to 2% by mass thereof. The additive amount in particular preferably ranges from 0.15 to 1% by mass thereof. When the additive amount is set to 0.005% by mass or more, the secondary battery can be restrained from being lowered in charge-discharge characteristics and being raised in internal resistance even after exposed to a high temperature environment. In the meantime, when the additive amount is set to 5% by mass or less, the electrolyte in the nonaqueous electrolytic solution can be restrained from being lowered in solubility in the solvent of the nonaqueous electrolytic solution.

Method for Producing Phosphodiester Salt:

Hereinafter, a description will be made about a method for producing the phosphodiester salt in the present embodiment.

The phosphodiester salt in the embodiment is produced, for example, by causing a dihalophosphate to react with a hydroxy compound. This reaction may be conducted in an organic solvent in the presence of a base.

The dihalophosphate is represented by $M(PO_2X_2)n$ wherein M represents a monovalent, bivalent or trivalent cation; Xs each represent a halogen atom; and when M is monovalent, n=1; when M is bivalent, n=2; or when M is trivalent, n=3. The dihalophosphate is a precursor in the production of the phosphodiester salt.

The symbol M is identical with M in the phosphodiester salt.

In the dihalophosphate, Xs each represent a halogen atom. Examples of the halogen atom include fluorine, chlorine, bromine, and iodine. Among these halogen atoms, fluorine and chlorine are preferred, and chlorine is more preferred from the viewpoint of easy availability, reactivity with the hydroxy compound, and operability when the dihalophosphate and the hydroxy compound are caused to react with each other.

In more detail, specific examples of the dihalophosphate include lithium diiodophosphate, sodium diiodophosphate, potassium diiodophosphate, lithium dibromophosphate, sodium dibromophosphate, potassium dibromophosphate, lithium dichlorophosphate, sodium dichlorophosphate, potassium dichlorophosphate, lithium difluorophosphate, sodium difluorophosphate, and potassium difluorophosphate. Among these dihalophosphates, lithium difluorophosphate and lithium dichlorophosphate are preferred from the viewpoint of reactivity with the hydroxy compound, and easy availability.

The hydroxy compound is not particularly limited. Examples thereof include an alcohol, a phenol compound, and a naphthol compound, a sugar, and an oxocarboxylic acid. These may be used alone or in any combination of two or more thereof. It is advisable to select, from these hydroxy compounds given as examples, an appropriate compound in accordance with, for example, the usage of the phosphodiester salt, which is an intended product. It is preferred from the viewpoint of easy availability to use, among these hydroxy compounds, an alcohol or a phenol compound.

The alcohol is not particularly limited. Examples thereof include linear alkyl alcohols such as methanol, ethanol, propanol, butanol, isopropyl alcohol, pentanol, hexanol, heptanol, and octanol; cyclic alkyl alcohols such as cyclopentanol and cyclohexanol; liner halogen-containing alcohols such as 2-iodoethanol, 2-bromoethanol, 2-chloroethanol, 2-fluoroethanol, 1,2-diiodoethanol, 1,2-dibromoethanol, 1,2-dichloroethanol, 1,2-difluoroethanol, 2,2-diiodoethanol, 2,2-dibromoethanol, 2,2-dichloroethanol, 2,2-difluoroethanol, 2,2,2-tribromoethanol, 2,2,2-trichloroethanol, 2,2,2-trifluoroethanol, and hexafluoro-2-propanol; cyclic halogen-containing alkyl alcohols such as 2-iodocyclohexanol, 2-bromocyclohexanol, 2-chlorocyclohexanol, and 2-fluorocyclohexanol; linear alkenyl alcohols such as 2-propenol, isopropenol, 2-butenyl alcohol, and 3-butenyl alcohol; cyclic alkenyl alcohols such as 2-cyclopentene-1-ol, 2-cyclohexene-1-ol, and 3-cyclohexene-1-ol; linear alkynyl alcohols such as 2-propynyl alcohol, 1-butynyl alcohol, 2-butynyl alcohol, 3-butynyl alcohol, 1-pentynyl alcohol, 2-pentynyl alcohol, 3-pentynyl alcohol, and 4-pentynyl alcohol; linear diols such as ethylene glycol, propylene glycol, 1,3-butanediol, and triethylene glycol; cyclic diols such as 1,2-cyclohexanediol, 1,3-cyclohexanediol, and 1,4-cyclohexanediol; linear triols such as trimethylolethane and trimethylol propane; and sugar alcohols such as sorbitol, maltitol, xylitol, mannitol, and erythritol. These may be used alone or in any combination of two or more thereof.

The phenol compound is not particularly limited. Examples thereof include phenol, hydroquinone, phloroglucinol, catechol, resorcinol, pyrogallol, 3-methoxyphenol, 4-methoxyphenol, cresol, 5-methoxyresorcinol, 3,5-dimethoxyphenol, and 4-phenoxyphenol. Examples of the phenol compound that is a halogen-containing phenol compound include 2-iodophenol, 2-bromophenol, 2-chlorophenol, 2-fluorophenol, 3-iodophenol, 3-bromophenol, 3-chlorophenol, 3-fluorophenol, 4-iodophenol, 4-bromophenol, 4-chlorophenol, 4-fluorophenol, 3,5-diiodophenol, 3,5-dibromophenol, 3,5-dichlorophenol, 3,5-difluorophenol, pentaiodophenol, pentabromophenol, pentachlorophenol, and pentafluorophenol. These may be used alone or in any combination of two or more thereof.

The naphthol compound is not particularly limited. Examples thereof include 1-naphthol, 2-naphthol, 1,6-dihydroxynaphthalene, 2,7-dihydroxynaphthalene, 2,6-dihydroxynaphthalene, 1,7-dihydroxynaphthalene, 3-amino-2-naphthol, and 5-amino-1-naphthol. These may be used alone or in any combination of two or more thereof.

The sugar is not particularly limited. Examples thereof include allose, gulose, glucose, altrose, mannose, galactose, idose, lyxose, xylose, arabinose, apiose, erythrose, threose, fructose, sorbose, tagatose, ribulose, xylulose, erythrulose, trehalose, kojibiose, nigerose, maltose, isomaltose, deoxyribose, glucuronic acid, glucosamine, galactosamine, ascorbic acid, glucronolactone, and gluconolactone. These may be used alone or in any combination of two or more thereof.

The oxocarboxylic acid is not particularly limited. Examples thereof include deltic acid, squaric acid, croconic acid, rhodizonic acid, and heptagoic acid. These may be used alone or in any combination of two or more thereof.

When the reaction between the dihalophosphate and the hydroxy compound is started, the reaction starting temperature is not particularly limited as far as the temperature permits the reaction to advance. It is advisable to select the temperature appropriately in accordance with the reactive species. Specifically, the temperature preferably ranges from 0 to 100° C. From the viewpoint of operability, the temperature more preferably ranges from 10 to 80° C., even more preferably from 20 to 40° C. When the reaction starting temperature is set to 100° C. or lower, energy consumed at the time of the reaction can be decreased. In the meantime, when the reaction starting temperature is set to 0° C. or higher, the reaction rate can be prevented from being remarkably attenuated. The means for adjusting the temperature is not particularly limited. When the system is cooled for the control to set the reaction starting temperature within the above-mentioned temperature range, the adjustment can be made by using ice to cool a reactor in which the dihalophosphate and the hydroxy compound are added. Moreover, when the system is heated for the control to set the reaction starting temperature within the above-mentioned temperature range, the adjustment can be made by means of, for example, a hot water bath set to an arbitrary temperature. Furthermore, when the temperature is high also during the reaction, the system may be cooled to, for example, around room temperature (20 to 30° C.).

The reaction period for the reaction between the dihalophosphate and the hydroxy compound is not particularly limited. It is advisable to set the period appropriately in accordance with the reactive species. Specifically, for example, the period preferably ranges from 2 to 12 hours. From the viewpoint of industrial production, the period more preferably ranges from 2 to 8 hours, even more preferably from 2 to 5 hours.

When the dihalophosphate and the hydroxy compound are caused to react with each other, it is preferred to conduct the reaction while the reaction system is stirred. This case makes the reaction period short. The stirring is preferably performed when the hydroxy compound is dropwise added to a solution containing the dihalophosphate. The stirring is also preferably performed to the end of the reaction.

The reaction between the dihalophosphate and the hydroxy compound can be conducted in an organic solvent. The organic solvent is not particularly limited as far as the solvent does not cause a trouble that the solvent reacts with some other reactant or the resultant product, or any other trouble. The solvent is preferably an aprotic organic solvent.

The aprotic organic solvent is not particularly limited. Examples thereof include a nitrile, an ester, a ketone, an ether, and a halogenated hydrocarbon.

The nitrile is not particularly limited. Examples thereof include acetonitrile and propionitrile. These may be used alone or in any combination of two or more thereof.

The ester is not particularly limited. Examples thereof include dimethyl carbonate, diethyl carbonate, ethylmethyl carbonate, ethylene carbonate, propylene carbonate, ethyl acetate, methyl acetate, and butyl acetate. These may be used alone or in any combination of two or more thereof.

The ketone is not particularly limited. Examples thereof include acetone, methyl ethyl ketone, methyl isobutyl ketone, and cyclohexanone. These may be used alone or in any combination of two or more thereof.

The ether is not particularly limited. Examples thereof include diethyl ether, tetrahydrofuran, and dimethoxyethane. These may be used alone or in any combination of two or more thereof.

The halogenated hydrocarbon is not particularly limited. Examples thereof include dichloromethane and chloroform. These may be used alone or in any combination of two or more thereof.

Other examples of the aprotic organic solvent include nitromethane, nitroethane, and dimethylformamide.

Among the aprotic organic solvents given as the above-mentioned examples, preferred are ethers in which any onium salt produced as a byproduct is low in solubility, and particularly preferred is dimethoxyethane, in which the produced phosphodiester salt is easily soluble.

The use amount of the organic solvent is preferably equal to or more than the mass of the dihalophosphate. The use amount is preferably from an amount equal to the mass to an amount 100 times the mass, more preferably from an amount 2 times the mass to an amount 50 times the mass. When the use amount of the organic solvent is made equal to or more than the mass of the dihalophosphate, the reactivity between the dihalophosphate and the hydroxy compound is prevented from being deteriorated to restrain the dihalophosphate from being lowered in yield and purity. The upper limit of the use amount of the organic solvent is not particularly limited. However, the use of the organic solvent in an excessive amount requires energy more than necessary when this solvent is distilled off. Thus, an industrial disadvantage may be produced. It is therefore preferred to set the upper limit of the use amount of the organic solvent appropriately in accordance with the reactive species.

It is preferred from the viewpoint of reaction rate to conduct the reaction between the dihalophosphate and the hydroxy compound in an organic solvent in the presence of a base. However, the present invention is not limited to only the embodiment in which the base is present in the organic solvent. Thus, the reaction can be conducted in the absence of any base.

The base is not particularly limited. Examples thereof include an amine and a metal hydroxide.

The amine is not particularly limited as far as the amine does not cause a trouble that the amine reacts with some other reactant or the resultant product, or any other trouble. Examples of such an amine include ammonia, a primary amine, a secondary amine, and a tertiary amine. These may be used alone or in any combination of two or more thereof. Among these amines, a tertiary amine is preferred from the viewpoint of the stability of the reaction between the dihalophosphate and the hydroxy compound.

The primary amine is not particularly limited. Examples thereof include methylamine, ethylamine, propylamine, and isopropylamine. The secondary amine is not particularly limited. Examples thereof include dimethylamine, diethylamine, diisopropylamine, dibutylamine, methylethylamine, methylpropylamine, methylbutylamine, butylpropylamine, and diisopropylamine. The tertiary amine is not particularly limited. Examples thereof include trimethylamine, triethylamine, tripropylamine, tributylamine, dimethylethylamine, methyldiethylamine, triisopropylamine, dimethylisopropylamine, diethylisopropylamine, dimethylpropylamine, and dimethylbutylamine Among these amines, triethylamine and trimethylamine are preferred from the viewpoint of easy availability, and the stability of the reaction between the dihalophosphate and the hydroxy compound.

The metal hydroxide is not particularly limited as far as the hydroxide does not cause a trouble that the hydroxide reacts with some other reactant or the resultant product, or any other trouble. Examples of such a metal hydroxide include lithium hydroxide, sodium hydroxide, potassium hydroxide, rubidium hydroxide, cesium hydroxide, magnesium hydroxide, calcium hydroxide, strontium hydroxide, barium hydroxide, and aluminum hydroxide. Among these metal hydroxides, preferred are lithium hydroxide, sodium hydroxide, potassium hydroxide, and calcium hydroxide from the viewpoint of easy availability. Lithium hydroxide, sodium hydroxide and potassium hydroxide are particularly preferred.

When the dihalophosphate and the hydroxy compound are caused to react with each other in the organic solvent, the use amount of the hydroxy compound is preferably 2 equivalents or more, more preferably from 2 to 20 equivalents, even more preferably from 2 to 15 equivalents, in particular preferably from 2 to 10 equivalents per equivalent of the dihalophosphate. When the use amount of the hydroxy compound is set to 2 equivalents or more, it is possible to prevent a situation where the reactivity between the dihalophosphate and the hydroxy compound is deteriorated so that an unreacted fraction of the dihalophosphate remains. As a result thereof, the phosphodiester salt can be restrained from being lowered in purity. The upper limit of the use amount of the hydroxy compound is not particularly limited. However, the use of the hydroxy compound in an excessive amount requires a production period and energy more than necessary when this compound is distilled off. Thus, industrial disadvantages may be produced. It is therefore preferred to set the upper limit of the use amount of the hydroxy compound appropriately in accordance with the reactive species and the reaction scale.

When the phosphodiester salt is synthesized in the organic solvent, the order of the addition of the individual raw materials is not particularly limited. Usually, the dihalophosphate is added into a reactor, and then the organic solvent and the hydroxy compound are successively added thereto. The word "equivalent" denotes a molar equivalent. The molar equivalent represents a ratio between substance amounts (unit: mole [mol]).

When the phosphodiester salt is synthesized in the organic solvent in the presence of a base, the use amount of the base is preferably 2 equivalents or more, more preferably from 2 to 3 equivalents, even more preferably from 2.1 to 2.5 equivalents, in particular preferably from 2.2 to 2.5 equivalents per equivalent of the dihalophosphate. When the use amount of the base is set to 2 equivalents or more, it is possible to restrain a situation where the reaction between the dihalophosphate and the hydroxy compound advances slowly so that the reaction period becomes long. It is also possible to prevent a situation where an uncreated fraction of the dihalophosphate or the hydroxy compound remains to lower the purity of the resultant phosphodiester salt. The upper limit of the use amount of the base is not particularly limited. However, the use of the base in an excessive amount requires a production period and energy more than necessary when this base is distilled away. Thus, industrial disadvantages may be produced. It is therefore preferred to set the upper limit of the use amount of the base appropriately in accordance with the reactive species and the reaction scale. The word "equivalent" referred to herein denotes a molar equivalent in the same manner as in the above-mentioned case.

The reaction between the dihalophosphate and the hydroxy compound may be conducted in the absence of any solvent. In this case, the hydroxy compound also functions as a reaction solvent.

When the dihalophosphate and the hydroxy compound are caused to react with each other in the absence of any solvent, the use amount of the hydroxy compound is preferably 2 equivalents or more, more preferably from 2 to 20 equivalents, even more preferably from 2 to 15 equivalents, in particular preferably from 2 to 10 equivalents per equivalent of the dihalophosphate. When the use amount of the hydroxy compound is set to 2 equivalents or more, it is possible to prevent a situation where the reactivity between the dihalophosphate and the hydroxy compound is deteriorated so that an unreacted fraction of the dihalophosphate remains. As a result, the phosphodiester salt can be restrained from being lowered in purity. The upper limit of the use amount of the hydroxy compound is not particularly limited since the hydroxy compound functions not only as one of the reactive species but also as a solvent. However, the use of the hydroxy compound in an excessive amount requires energy more than necessary when this compound is distilled off. Thus, an industrial disadvantage may be produced. It is therefore preferred to set the upper limit of the use amount of the hydroxy compound appropriately in accordance with the reactive species. The word "equivalent" referred to herein denotes a molar equivalent in the same manner as in the above-mentioned case.

When the dihalophosphate and the hydroxy compound are caused to react with each other in the absence of any solvent, the reaction may be conducted in the presence of the above-mentioned base. The kind of the base is preferably as described above. The use amount of the base is preferably 2 equivalents or more, more preferably from 2 to 3 equivalents, even more preferably from 2.1 to 2.5 equivalents, in particular preferably from 2.2 to 2.5 equivalents per equivalent of the dihalophosphate. When the use amount of the base is set to 2 equivalents or more, it is possible to restrain a situation where the reaction between the dihalophosphate and the hydroxy compound advances slowly so that the reaction period becomes long. It is also possible to prevent a situation where an unreacted fraction of the dihalophosphate or the hydroxy compound remains to lower the purity of the resultant phosphodiester salt. The upper limit of the use amount of the base is not particularly limited. However, the use of the base in an excessive amount requires a production period and energy more than necessary when this base is distilled off. Thus, industrial disadvantages may be produced. It is therefore preferred to set the upper limit of the use amount of the base appropriately in accordance with the reactive species or the reaction scale. The word "equivalent" referred to herein denotes a molar equivalent in the same manner as in the above-mentioned case.

When the phosphodiester salt is synthesized in the absence of any solvent, the order of the addition of the individual raw materials is not particularly limited. Usually, the hydroxy compound, which functions as a solvent, is added into a reactor, and subsequently the dihalophosphate is added thereto.

<Electrolyte>

The above-mentioned electrolyte may be an electrolyte known in the prior art. When the electrolyte is for lithium ion batteries, the electrolyte may be a lithium salt. When the electrolyte is for sodium ion batteries, the electrolyte may be a sodium salt. It is therefore advisable to select the kind of the electrolyte appropriately in accordance with the kind of the secondary battery.

The electrolyte is preferably an electrolyte containing an anion containing fluorine. Specific examples of such a fluorine-containing anion include $BF_4^-$, $PF_6^-$, $BF_3CF_3^-$, $BF_3C_2F_5^-$, $CF_3SO_3^-$, $C_2F_5SO_3^-$, $C_3F_7SO_3^-$, $C_4F_9SO_3^-$, $N(SO_2F)_2^-$, $N(CF_3SO_2)_2^-$, $N(C_2F_5SO_2)_2^-$, $N(CF_3SO_2)(CF_3CO)^-$, $N(CF_3SO_2)(C_2F_5SO_2)^-$, and $C(CF_3SO_2)_3^-$. These may be used alone or in any combination of two or more thereof. Among fluorine-containing anions, $BF_4^-$, $PF_6^-$, and $N(CF_3SO_2)_2^-$ are preferred and $BF_4^-$ and $PF_6^-$ are particularly preferred from the viewpoint of improvements in the safety/stability and electric conductivity of the non-aqueous electrolytic solution and the cycle characteristics of the secondary battery.

The concentration of the electrolyte in the organic solvent is not particularly limited, and is usually from 0.1 to 2 M, preferably from 0.15 to 1.8 M, more preferably from 0.2 to 1.5 M, in particular preferably from 0.3 to 1.2 M. When the concentration is set to 0.1 M or more, the nonaqueous electrolytic solution can be prevented from becoming insufficient in electric conductivity. In the meantime, when the concentration is set to 2 M or less, it is possible to restrain a situation where the nonaqueous electrolytic solution is raised in viscosity to be lowered in electric conductivity. Thus, the secondary battery can be prevented from being lowered in performance.

<Organic Solvent>

The organic solvent (nonaqueous solvent) used in the nonaqueous electrolytic solution is not particularly limited. Examples thereof include a cyclic carbonate, a linear carbonate, a phosphate, a cyclic ether, a linear ether, a lactone compound, a linear ester, a nitrile compound, an amide compound, and a sulfone compound. Among these organic solvents, carbonates are preferred from the viewpoint of being each generally used as an organic solvent for lithium secondary batteries.

The cyclic carbonate is not particularly limited. Examples thereof include ethylene carbonate, propylene carbonate, and butylene carbonate. Among these examples, preferred are ethylene carbonate, propylene carbonate and other cyclic carbonates to improve the charge efficiency of the lithium secondary battery. The linear carbonate is not particularly limited. Examples thereof include dimethyl carbonate, ethylmethyl carbonate, and diethyl carbonate. Among these examples, preferred are dimethyl carbonate and ethylmethyl carbonate to improve the charge efficiency of the lithium secondary battery. The phosphate is not particularly limited. Examples thereof include trimethyl phosphate, triethyl phosphate, ethyldimethyl phosphate, and diethylmethyl phosphate. The cyclic ether is not particularly limited. Examples thereof include tetrahydrofuran and 2-methyltetrahydrofuran. The linear ether is not particularly limited. An example thereof is dimethoxyethane. The lactone compound is not particularly limited. An example thereof is a γ-butyrolactone. The linear ester is not particularly limited. Examples thereof include methyl propionate, methyl acetate, ethyl acetate, and methyl formate. The nitrile compound is not particularly limited. An example thereof is acetonitrile. The amide compound is not particularly limited. An example thereof is dimethylformamide. The sulfone compound is not particularly limited. Examples thereof include sulfolane and methylsulfolane. The organic solvent in the nonaqueous electrolytic solution is also preferably any solvent obtained by substituting hydrogen of any hydrocarbon group contained in any one of the above-mentioned organic solvent molecules at least partially with fluorine. These organic solvents may be used alone or in the form of a mixture of two or more thereof.

The organic solvent is preferably a carbonate from the viewpoint of easy availability and performance.

<Production of Nonaqueous Electrolytic Solution>

The nonaqueous electrolytic solution of the present embodiment is obtained, for example, by adding an electrolyte salt as described above to an organic solvent (nonaqueous solvent) as described above, and further adding, to the resultant, a phosphodiester salt as an additive. At this time, it is preferred that the organic solvent, the electrolyte salt, the phosphodiester salt, and other additives are beforehand subjected to, for example, purification to make the amount of impurities therein as small as possible as far as this operation does not lower the productivity of the nonaqueous electrolytic solution, and then the resultant components are used.

<Others>

Any other additive known in the prior art may be added to the nonaqueous electrolytic solution according to the present embodiment.

Secondary Battery:

The following will describe the secondary battery of the present invention. FIG. 1 is a schematic sectional view which schematically illustrates a secondary battery having the above-mentioned nonaqueous electrolytic solution.

As illustrated in FIG. 1, the secondary battery according to the present embodiment has a structure in which in an internal space formed by a positive electrode can 4 and a negative electrode can 5, a stacked body is held. In the stacked body, from the positive electrode can 4-side of the body, a positive electrode 1, a separator 3, a negative electrode 2, and a spacer 7 are stacked in this order. By interposing a spring 8 between the negative electrode can 5 and the separator 7, the positive electrode 1 and the negative electrode 2 can be pressed and bonded to each other in an appropriate degree to be fixed to each other. The positive electrode 1, the separator 3, and the negative electrode 2 are impregnated with the nonaqueous electrolytic solution, which contains a phosphodiester salt, in the present embodiment. By putting the positive electrode can 4 and the negative electrode can 5 onto each other in the state of interposing a gasket 6 between the positive electrode can 4 and the negative electrode can 5, the two are bonded to each other so that the stacked body comes into an airtightly sealed state.

The material of a positive active material layer in the positive electrode 1 is not particularly limited, and is, for example, a transition metal compound having a structure from which lithium ions can diffuse, or an oxide of the transition metal compound and lithium. Specific examples thereof include $LiCoO_2$, $LiNiO_2$, $LiMn_2O_4$, and $LiFePO_4$.

When the secondary battery is a lithium ion battery, the positive electrode 1 can be obtained by press-molding any one of the positive active materials listed up above together with a conducting aid and a binder each known, or by blending the positive active material, together with a conducting aid and a binder each known, in an organic solvent such as pyrrolidone to prepare a paste, applying the paste onto a collector such as an aluminum foil piece, and then drying the resultant.

When the secondary battery is a sodium ion battery, the material of a positive active material layer in the positive electrode 1 is not particularly limited, and is, for example, a transition metal compound having a structure from which sodium ions can diffuse, or an oxide of the transition metal compound and sodium. Specific examples thereof include $NaFeO_2$, $NaNiO_2$, $NaCoO_2$, $NaMnO_2$, $NaVO_2$, and $Na_2Cr_2O_4$.

When the secondary battery is a lithium ion battery, the material of a negative active material layer in the negative electrode 2 is not particularly limited as far as the material can store and release lithium. Examples thereof include metal lithium; alloys such as Sn—Cu, Sn—Co, Sn—Fe, and Sn—Ni, metal oxides such as $Li_4Ti_5O_{12}$ and $Li_5Fe_2O_3$; and carbon materials such as natural graphite, artificial graphite, graphite boride, meso-carbon microbeads, pitch type carbon fiber, graphitized products, and carbon nanotubes.

When the secondary battery is a sodium ion battery, the material of a negative active material layer in the negative electrode 2 is not particularly limited as far as the material can store and release sodium. Examples thereof include metal sodium; metal oxides such as $Na_2Ti_6O_{13}$; and carbon materials such as natural graphite, artificial graphite, graphite boride, meso-carbon microbeads, pitch type carbon fiber, graphitized products, and carbon nanotubes.

The negative electrode 2 may be an electrode in the form of a foil piece or powder of any one of the above-mentioned electrode materials. In the case of the powdery negative electrode, this negative electrode can be obtained by press-molding the negative electrode material together with a conducting aid and a binder each known, or by blending the material, together with a conducting aid and a binder each known, in an organic solvent such as pyrrolidone to prepare a paste, applying the paste onto a collector such as a copper foil piece, and then drying the resultant.

In the secondary battery according to the present embodiment, between the positive electrode 1 and the negative electrode 2, the separator 3 is usually interposed in order to prevent these electrodes from being short-circuited. The material and the shape of the separator 3 are not particularly limited. The material is preferably an electrically-insulating chemically-stable material through which the above-mentioned nonaqueous electrolytic solution is easy to pass. The separator 3 is, for example, a microporous film or sheet made of a polymeric material that may be of various types. Specific examples of the polymeric material include nylon (registered trade name), nitrocellulose, polyacrylonitrile, polyvinylidene fluoride, and polyolefin polymers such as polyethylene and polypropylene. From the viewpoint of electrochemical stability and chemical stability, polyolefin polymers are preferred.

An optimal use voltage for the secondary battery of the present embodiment is varied in accordance with the combination of the positive electrode 1 with the negative electrode 2. Usually, the secondary battery is usable at an average discharge voltage ranging from 2.4 to 4.5 V.

The form of the secondary battery of the present embodiment is not particularly limited, and may be, for example, a cylindrical form, a rectangular form, or a laminate form besides the coin-shaped cell illustrated in FIG. 1.

The secondary battery according to the present embodiment can be restrained from being lowered in charge-discharge characteristics and raised in internal resistance after stored in a temperature load environment. Thus, the nonaqueous electrolytic solution of the present embodiment is usable suitably for secondary batteries. However, the secondary battery illustrated in FIG. 1 is an example of an embodiment of the secondary battery of the present invention. Thus, the secondary battery of the invention is not limited to this battery.

EXAMPLES

Hereinafter, preferred examples of this invention will be illustratively described in detail. However, about materials, blended amounts and others that are described in the examples, the scope of this invention is not limited only to these described matters unless the specification especially includes a restrictive description thereabout.
Synthesis of Phosphodiester Salt:

In a PFA container was added 5.0 g of lithium dichlorophosphate, and subsequently 30 g of dimethoxyethane was added thereto. Thereafter, 9.0 g of triethylamine was added thereto. While the reaction system was stirred, 35.5 g of trifluoroethanol was dropwise added thereto at room temperature (20° C.). During the addition, it was verified that the system generated heat and a white precipitate was deposited in the system.

Thereafter, the PFA container was cooled to room temperature, and then the reaction system was stirred for 3 hours. Furthermore, the system was subjected to filtration under a reduced pressure to separate the white precipitate and the dimethoxyethane solution from each other.

This white precipitate was analyzed through cation chromatography (trade name: ICS-1500, manufactured by Dionex). As a result, only triethylamine was detected. This white precipitate was also analyzed through anion chromatography (trade name: IC-850, manufactured by Metrohm AG). As a result, only chloride ions were detected. By the analyses, it was verified that a hydrochloride salt of triethylamine was produced as a by-product precipitate at the time of causing lithium dichlorophosphate, 2,2,2-trifluoroethanol, and triethylamine to react with one another.

Subsequently, from the filtrate, dimethoxyethane was distilled off to yield 8.4 g of a white solid. This white solid was subjected to anion analysis using ion chromatography (IC-850, manufactured by Metrohm AG). As a result, no peak of phosphate anions originating from the raw materials was verified. Chlorine ions and a new peak were verified.

Subsequently, the concentration of the chlorine ions was analyzed. As a result, the concentration was 1.0%. The purity of the white solid that was gained from the anion analysis through the ion chromatography was 99.0% according to a subtracting method.

An FT-IR (SPECTRUM 2000, manufactured by PerkinElmer, Inc.) was used to check an infrared absorption spectrum of this white solid. As a result, it was verified that the resultant compound had an absorption originating from P—O—C bonds at about 950 cm$^{-1}$. Furthermore, it was verified that this compound had a peak originating from C—F bonds at about 1150 cm$^{-1}$. From these results, the resultant white solid was determined to be lithium bis(2,2,2-trifluoroethyl)phosphate having an anion content of 99.0%.

Example 1

Production of Nonaqueous Electrolytic Solution for Lithium Ion Batteries

Inside a dry box having an argon atmosphere having a dew point of −70° C. or lower, a primary nonaqueous electrolytic solution was prepared to set the concentration of LiPF$_6$ to 1.0 mole/liter in a mixed solvent (manufactured by Kishida Chemical Co., Ltd.; lithium battery grade) of ethylene carbonate (EC) and dimethyl carbonate (DMC) (ratio by volume of EC:DMC=1:1). Furthermore, a preparation was made to set the addition amount of the lithium bis(2,2,2-trifluoroethyl)phosphate to 0.5% by mass of the whole of the nonaqueous electrolytic solution. In this way, a nonaqueous electrolytic solution according to the present example for lithium ion batteries was produced.

Example 2

In the present example, a nonaqueous electrolytic solution for lithium ion batteries was prepared in the same way as in Example 1 except that instead of lithium bis(2,2,2-trifluoroethyl)phosphate in Example 1, lithium diethylphosphate was added at a proportion of 0.5% by mass.

Comparative Example 1

In the present example, a nonaqueous electrolytic solution for lithium ion batteries was prepared in the same way as in Example 1 except that instead of lithium bis(2,2,2-trifluoroethyl)phosphate in Example 1, lithium difluorophosphate was added at a proportion of 0.5% by mass.

Comparative Example 2

In the comparative example, a nonaqueous electrolytic solution for lithium ion batteries was prepared in the same way as in Example 1 except the lithium bis(2,2,2-trifluoroethyl)phosphate in Example 1 was not added.

Example 3

Production of Nonaqueous Electrolytic Solution for Sodium Ion Batteries

Inside a dry box having an argon atmosphere having a dew point of −70° C. or lower, a primary nonaqueous electrolytic solution was prepared to set the concentration of NaPF$_6$ to 1.0 mole/liter in propylene carbonate (manufactured by Kishida Chemical Co., Ltd.; lithium battery grade). Furthermore, a preparation was made to set the addition amount of the sodium bis(2,2,2-trifluoroethyl)phosphate to 0.5% by mass of the whole of the nonaqueous electrolytic solution. In this way, a nonaqueous electrolytic solution according to the present example for sodium ion batteries was produced.

Comparative Example 3

In the comparative example, a nonaqueous electrolytic solution for sodium ion batteries was prepared in the same way as in Example 1 except that instead of sodium bis(2,2,2-trifluoroethyl)phosphate in Example 2, sodium difluorophosphate was added at a proportion of 0.5% by mass.

Comparative Example 4

In the comparative example, a nonaqueous electrolytic solution for sodium ion batteries was prepared in the same way as in Example 2 except that sodium bis(2,2,2-trifluoroethyl)phosphate in Example 2 was not added.

Figure 2:
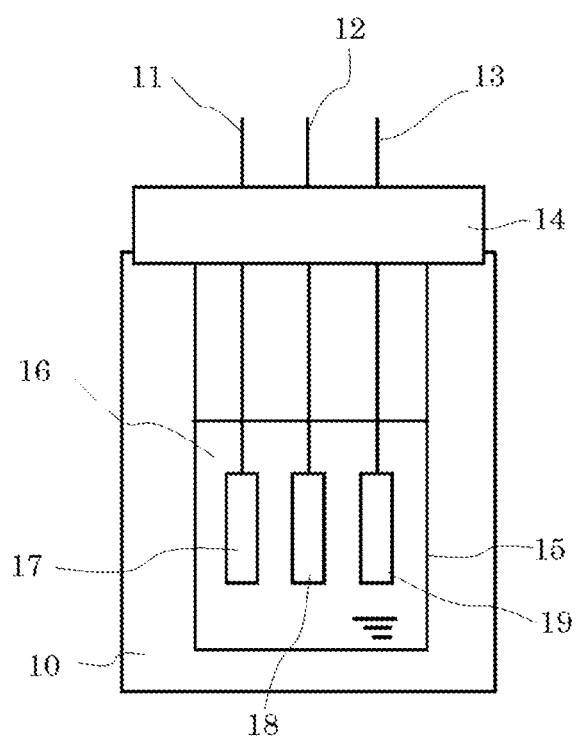
FIG. 2 is a schematic sectional view which schematically illustrates a cell for electrochemical characteristic evaluation containing a nonaqueous electrolytic solution of the present invention for secondary batteries.

Evaluation of Electrochemical Characteristics:

Subsequently, about the nonaqueous electrolytic solution of each of the working examples and the comparative examples, electrochemical characteristics were evaluated. In the evaluation, a three-electrode-type evaluation cell illustrated in FIG. 2 was used. A container 15 made of glass and having a lid 14 made of Teflon (registered trade name) in the evaluation cell in FIG. 2 was filled with the nonaqueous electrolytic solution yielded in each of the working examples and the comparative examples. A working electrode 17 was supported by a supporting rod 11 for the working electrode made of stainless steel; a reference electrode 18 was supported by a supporting rod 12 for the reference electrode made of stainless steel; and a counter electrode 19 was supported by a supporting rod 13 for the counter electrode made of stainless steel. About the working electrode 17, one among electrodes described below was used in accordance with the kind of the secondary battery.

<Lithium Ion Battery>

Case of Evaluating the Negative Electrode Material of the Lithium Ion Battery:

As the working electrode 17, an electrode was used which was obtained by cutting out a natural graphite sheet (manufactured by Piotrek Co., Ltd.) into a 1-cm square piece.

Case of Evaluating the Positive Electrode Material of the Lithium Ion Battery:

As the working electrode 17, an electrode was used which was obtained by cutting out $LiNiCoMnO_2$ (manufactured by Piotrek Co., Ltd.) into a 1-cm square piece.

As each of the reference electrode 18 and the counter electrode 19, a lithium foil piece was used notwithstanding whether the positive or negative electrode material was to be evaluated.

<Sodium Ion Battery>

Case of Evaluating the Negative Electrode Material of the Sodium Ion Battery:

As the working electrode 17, an electrode was used which was obtained by cutting out a hard carbon sheet (manufactured by AT Electrode Co., Ltd.) into a 1-cm square piece.

Case of Evaluating the Positive Electrode Material of the Sodium Ion Battery:

As the working electrode 17, an electrode was used which was obtained by making $Na_2Cr_2O_4$ together with an active material, a known conducting aid and a known binder into a paste form, applying the paste onto a collector made of aluminum foil, drying the paste, making the dried paste into a sheet form, and then cutting out the sheet into a 1-cm square piece.

As each of the reference electrode 18 and the counter electrode 19, a sodium foil piece was used notwithstanding a difference between the positive and negative electrode materials.

The stainless steel supporting rod 11 for the working electrode, the stainless steel supporting rod 12 for the reference electrode, and the stainless steel supporting rod 13 for the counter electrode were fixed through the Teflon lid 14. The Teflon lid was fitted to the glass container 15 in which a nonaqueous electrolytic solution 16 was added. Simultaneously, the working electrode 17, the reference electrode 18 and the counter electrode 19 were simultaneously immersed in the nonaqueous electrolytic solution 16.

Moreover, the glass container 15 was inserted and fitted into a block 10 made of aluminum, the temperature of the block 10 being controllable, to adjust the temperature of the inside of the glass container 15.

As an electrochemical measuring instrument, PGSTAT302N manufactured by Metrohm Autolab was used to carry out cyclic voltammetry measurements and AC impedance measurements. All operations from the fabrication of the evaluation cell to the measurements were made in the argon glove box, which had a dew point of −70° C. or lower.

<Evaluation of Negative Electrode Material of Each Lithium Ion Battery>

The present evaluation was made, using the nonaqueous electrolytic solution, for lithium ion batteries, produced in each of Examples 1 and 2 and Comparative Examples 1 and 2.

Specifically, at a temperature set to 25° C., the cell of each of the examples was subjected to one of the cyclic voltammetry measurements in 5 cycles that were each a cycle from the immersion potential to 5 mV at a sweep rate of 1 mV/second. Furthermore, the examples were compared with one another to be evaluated about the reversibility of their charge-discharge reaction from the charge current and the discharge current. The discharge capacity of Comparative Example 2 in the $5^{th}$ cycle was regarded as 100; and the ratio of the capacity of each of Examples 1 and 2, and Comparative Example 1 to the value 100, as well as the charge-discharge efficiency of each of the nonaqueous electrolytic solutions in the $5^{th}$ cycle is shown in Table 1 below.

TABLE 1

| Kind of electrolytic solution | Capacity ratio | Charge-discharge efficiency (%) in 5th cycle |
|---|---|---|
| Example 1 | 99 | 98.4 |
| Example 2 | 103 | 95.9 |
| Comparative Example 1 | 84 | 96.0 |
| Comparative Example 2 | 100 | 97.6 |

Next, while the temperature of the cell was kept at 25° C., the cell was charged to 100 mV at a charge current of 0.7 mA. Thereafter, the cell was kept at 100 mV for 3 hours. Moreover, while the application of the voltage of 100 mV was kept as it was, the temperature was raised to 60° C. The cell was then kept at 60° C. Thereafter, the temperature was lowered to 0° C. step by step, and the AC impedance was measured. In this way, among the examples, comparison and evaluation were made about the electrode resistance. The resistance of the nonaqueous electrolytic solution of Comparative Example 2 when it was used at 0° C. was regarded as 100; and in Table 2 below is shown the ratio of the electrode resistance in the nonaqueous electrolytic solution of each of Examples 1 and 2, and Comparative Example 1 to the value 100.

TABLE 2

| Kind of electrolytic solution | Resistance ratio |
|---|---|
| Example 1 | 52 |
| Example 2 | 50 |
| Comparative Example 1 | 132 |
| Comparative Example 2 | 100 |

<Evaluation of Positive Electrode Material of Each Lithium Ion Battery>

The present evaluation was made, using the nonaqueous electrolytic solution, for lithium ion batteries, produced in each of Examples 1 and 2 and Comparative Examples 1 and 2.

The same cyclic voltammetry measurement as described above was again made except that the above-mentioned conditions were changed to conditions that the measurement was made in each cycle from the immersion potential to 4500 mV at a sweep rate of 1 mV/second and 25° C. The discharge capacity of Comparative Example 2 in the 5$^{th}$ cycle was regarded as 100; and the ratio of the capacity of each of Examples 1 and 2, and Comparative Example 1 to the value 100, as well as the charge-discharge efficiency of each of the nonaqueous electrolytic solutions in the 5th cycle is shown in Table 3 below.

TABLE 3

| Kind of electrolytic solution | Capacity ratio | Charge-discharge efficiency (%) in 5th cycle |
| --- | --- | --- |
| Example 1 | 116 | 99.4 |
| Example 2 | 120 | 99.1 |
| Comparative Example 1 | 96 | 99.6 |
| Comparative Example 2 | 100 | 99.5 |

Subsequently, while the temperature of the cell was kept at 25° C., the cell was charged to 4200 mV at a charge current of 0.7 mA. Thereafter, the cell was kept at 4200 mV for 3 hours. Moreover, while the application of the voltage of 4200 mV was kept as it was, the temperature was raised to 60° C. The cell was then kept at 60° C. Thereafter, the temperature was lowered to 0° C. step by step, and the AC impedance was measured. In this way, among the examples, comparison and evaluation were made about the electrode resistance. The resistance of the nonaqueous electrolytic solution of Comparative Example 2 when it was used at 0° C. was regarded as 100; and in Table 4 below is shown the ratio of the electrode resistance in the nonaqueous electrolytic solution of each of Examples 1 and 2, and Comparative Example 1 to the value 100.

TABLE 4

| Kind of electrolytic solution | Resistance ratio |
| --- | --- |
| Example 1 | 34 |
| Example 2 | 40 |
| Comparative Example 1 | 93 |
| Comparative Example 2 | 100 |

<Evaluation of Negative Electrode Material of Each Sodium Ion Battery>

The present evaluation was made, using the nonaqueous electrolytic solution, for sodium ion batteries, produced in each of Example 3 and Comparative Examples 3 and 4.

Specifically, at a temperature set to 25° C., the cell of each of the examples was subjected to a cyclic voltammetry measurement in 5 cycles that were each a cycle from the immersion potential to 5 mV at a sweep rate of 1 mV/second. Furthermore, the examples were compared with one another to be evaluated about the reversibility of their charge-discharge reaction from the charge current and the discharge current. The discharge capacity of Comparative Example 4 in the 5$^{th}$ cycle was regarded as 100; and the ratio of the capacity of each of Example 3 and Comparative Example 3 to the value 100, as well as the charge-discharge efficiency of each of the nonaqueous electrolytic solutions in the 5$^{th}$ cycle is shown in Table 5 below.

TABLE 5

| Kind of electrolytic solution | Capacity ratio | Charge-discharge efficiency (%) in 5th cycle |
| --- | --- | --- |
| Example 3 | 98 | 99.3 |
| Comparative Example 3 | 83 | 99.5 |
| Comparative Example 4 | 100 | 99.6 |

Next, while the temperature of the cell was kept at 25° C., the cell was charged to 100 mV at a charge current of 0.7 mA. Thereafter, the cell was kept at 100 mV for 3 hours. Moreover, while the application of the voltage of 100 mV was kept as it was, the temperature was raised to 60° C. The cell was then kept at 60° C. Thereafter, the temperature was lowered to 0° C. step by step, and the AC impedance was measured. In this way, among the examples, comparison and evaluation were made about the electrode resistance. The resistance of the nonaqueous electrolytic solution of Comparative Example 4 when it was used at 0° C. was regarded as 100; and in Table 6 below is shown the ratio of the electrode resistance in the nonaqueous electrolytic solution of each of Example 3 and Comparative Example 3 to the value 100.

TABLE 6

| Kind of electrolytic solution | Resistance ratio |
| --- | --- |
| Example 3 | 55 |
| Comparative Example 3 | 110 |
| Comparative Example 4 | 100 |

<Evaluation of Positive Electrode Material of Each Sodium Ion Battery>

The present evaluation was made, using the nonaqueous electrolytic solution, for sodium ion batteries, produced in each of Example 3 and Comparative Examples 3 and 4.

Specifically, the same cyclic voltammetry measurement as described above was again made except that the above-mentioned conditions were changed to conditions that the measurement was made in each cycle from the immersion potential to 3400 mV at a sweep rate of 1 mV/second and 25° C. The discharge capacity of Comparative Example 4 in the 5$^{th}$ cycle was regarded as 100; and the ratio of the capacity of each of Example 3 and Comparative Example 3 to the value 100, as well as the charge-discharge efficiency of each of the nonaqueous electrolytic solutions in the 5$^{th}$ cycle is shown in Table 7 below.

TABLE 7

| Kind of electrolytic solution | Capacity ratio | Charge-discharge efficiency (%) in 5th cycle |
| --- | --- | --- |
| Example 3 | 115 | 99.8 |
| Comparative Example 3 | 101 | 99.9 |
| Comparative Example 4 | 100 | 99.8 |

Subsequently, while the temperature of the cell was kept at 25° C., the cell was charged to 3400 mV at a charge current of 0.7 mA. Thereafter, the cell was kept at 3400 mV for 3 hours. Moreover, while the application of the voltage of 3400 mV was kept as it was, the temperature was raised to 60° C. The cell was then kept at 60° C. Thereafter, the temperature was lowered to 0° C. step by step, and the AC impedance was measured. In this way, among the examples, comparison and evaluation were made about the electrode resistance. The resistance of the nonaqueous electrolytic solution of Comparative Example 4 when it was used at 0°

C. was regarded as 100; and in Table 8 below is shown the ratio of the electrode resistance in the nonaqueous electrolytic solution of each of Example 3 and Comparative Example 3 to the value 100.

TABLE 8

| Kind of electrolytic solution | Resistance ratio |
|---|---|
| Example 3 | 27 |
| Comparative Example 3 | 90 |
| Comparative Example 4 | 100 |

DESCRIPTION OF REFERENCE SIGNS

1: Positive electrode
2: Negative electrode
3: Separator
4: Positive electrode can
5: Negative electrode can
6: Gasket
7: Spacer
8: Spring
10: Aluminum block
11: Stainless steel supporting rod for working electrode
12: Stainless steel supporting rod for reference electrode
13: Stainless steel supporting rod for counter electrode
14: Teflon lid
15: Glass container
16: Nonaqueous electrolytic solution
17: Working electrode
18: Reference electrode
19: Counter electrode

What is claimed is:

1. A nonaqueous electrolytic solution for a secondary battery comprising;
a nonaqueous solvent and an electrolyte, and
a phosphodiester salt represented by the following chemical formula (1) as an additive, wherein the phosphodiester salt in the nonaqueous electrolytic solution ranges from 0.005 to 1% by mass relative to a total mass of the nonaqueous electrolytic solution,

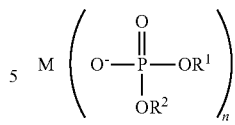
(1)

wherein M represents one or more alkali metal ion selected from sodium, potassium, rubidium and cesium, an alkaline earth metal ion, a transition metal ion, a quaternary phosphonium ion, or a sulfonium ion; n represents a natural number of 1 to 3; $R^1$ and $R^2$ each independently represent a hydrocarbon group having 1 to 20 carbon atom(s), or a hydrocarbon group having 1 to 20 carbon atom(s) having at least one selected from the group consisting of a halogen atom, a heteroatom, and unsaturated bond.

2. A secondary battery, comprising:
a nonaqueous electrolytic solution including a phosphodiester salt;
a positive electrode; and
a negative electrode,
wherein the phosphodiester salt is an additive represented by the following chemical formula (1), wherein the phosphodiester salt in the nonaqueous electrolytic solution ranges from 0.005 to 1% by mass relative to a total mass of the nonaqueous electrolytic solution,

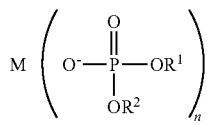
(1)

wherein M represents one or more alkali metal ion selected from sodium, potassium, rubidium and cesium, an alkaline earth metal ion, a transition metal ion, a quaternary phosphonium ion, or a sulfonium ion; n represents a natural number of 1 to 3; $R^1$ and $R^2$ each independently represent a hydrocarbon group having 1 to 20 carbon atom(s), or a hydrocarbon group having 1 to 20 carbon atom(s) having at least one selected from the group consisting of a halogen atom, a heteroatom, and unsaturated bond.

* * * * *